US011799376B2

(12) United States Patent
Li et al.

(10) Patent No.: US 11,799,376 B2
(45) Date of Patent: Oct. 24, 2023

(54) BUCK-BOOST CIRCUIT AND CONTROL METHOD

(71) Applicant: SPREADTRUM COMMUNICATIONS (SHANGHAI) CO., LTD., Shanghai (CN)

(72) Inventors: Mengzhang Li, Shanghai (CN); Yongjin Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 166 days.

(21) Appl. No.: 17/426,598

(22) PCT Filed: Mar. 5, 2019

(86) PCT No.: PCT/CN2019/077012
§ 371 (c)(1),
(2) Date: Jul. 28, 2021

(87) PCT Pub. No.: WO2020/155288
PCT Pub. Date: Aug. 6, 2020

(65) Prior Publication Data
US 2022/0294351 A1 Sep. 15, 2022

(30) Foreign Application Priority Data
Jan. 28, 2019 (CN) .......................... 201910081664.8

(51) Int. Cl.
H02M 3/158 (2006.01)
H02M 1/00 (2006.01)
H02M 3/156 (2006.01)

(52) U.S. Cl.
CPC ....... H02M 3/1582 (2013.01); H02M 1/0025 (2021.05); H02M 1/0095 (2021.05); H02M 3/1566 (2021.05)

(58) Field of Classification Search
CPC ... H02M 3/1582; H02M 3/158; H02M 1/0095
See application file for complete search history.

(56) References Cited

U.S. PATENT DOCUMENTS 8,508,208 B2 * 8/2013 Klein ................. H02M 3/1582
323/284
8,912,769 B2 12/2014 Lin et al.
(Continued)

FOREIGN PATENT DOCUMENTS

CN 102082505 A 6/2011
CN 102594133 A 7/2012
(Continued)

OTHER PUBLICATIONS

Extended European Search Report dated Sep. 14, 2022, issued in corresponding international Application No. 19912311, filed Mar. 5, 2019, 6 pages.
(Continued)

Primary Examiner — Gustavo A Rosario-Benitez
(74) Attorney, Agent, or Firm — CHRISTENSEN O'CONNOR JOHNSON KINDNESS PLLC

(57) ABSTRACT

A buck-boost circuit is provided. A first terminal of a first switch is connected to an anode of an input power supply, a first terminal of a second switch is connected to an anode of an output power supply, a first terminal of a third switch and a first terminal of a first inductor are connected to a second terminal of the first switch, a first terminal of a fourth switch is connected to a second terminal of the first inductor and a second terminal of the second switch, a fifth switch is connected between the input power supply and the output power supply, and a first terminal of a first capacitor is connected to the anode of the output power supply, and a
(Continued)

second terminal of the first capacitor is connected to the anode and a cathode of the input power supply through switches, respectively.

8 Claims, 5 Drawing Sheets

(56) References Cited

U.S. PATENT DOCUMENTS

| | | | |
|---|---|---|---|
| 9,491,314 B2 | 11/2016 | Wimpenny | |
| 9,660,527 B2* | 5/2017 | Glovinski | H02M 3/158 |
| 9,966,852 B1* | 5/2018 | Chen | H02M 3/1588 |
| 10,135,340 B1* | 11/2018 | Megaw | H02M 3/1582 |
| 10,615,696 B2* | 4/2020 | Jung | G05F 1/577 |
| 2009/0167262 A1* | 7/2009 | Schoofs | H02M 7/4837 323/263 |
| 2012/0274295 A1 | 11/2012 | Lin et al. | |
| 2014/0268946 A1 | 9/2014 | Liu | |
| 2015/0263634 A1* | 9/2015 | Fu | H02M 3/33573 363/21.02 |
| 2016/0020693 A1 | 1/2016 | Ribarich | |
| 2017/0126120 A1* | 5/2017 | Chakraborty | H02M 3/158 |
| 2018/0358898 A1* | 12/2018 | Yamaguchi | G05F 1/461 |
| 2021/0083580 A1* | 3/2021 | Zhang | H02M 1/0095 |
| 2021/0336541 A1* | 10/2021 | Xie | H02M 3/158 |

FOREIGN PATENT DOCUMENTS

| | | |
|---|---|---|
| CN | 102761249 A | 10/2012 |
| CN | 102594133 B | 10/2014 |
| CN | 104660039 A | 5/2015 |
| CN | 105075085 A | 11/2015 |
| CN | 106160460 A | 11/2016 |
| CN | 106341042 A | 1/2017 |
| CN | 107342686 A | 11/2017 |
| CN | 107359791 A | 11/2017 |
| CN | 208241576 U | 12/2018 |
| JP | H10262367 A | 9/1998 |
| JP | 2006033974 A | 2/2006 |
| JP | 5081110 B2 | 11/2012 |

OTHER PUBLICATIONS

Chinese First Office Action, dated Oct. 23, 2020, issued in corresponding Chinese Application No. 201910081664.8, filed Jan. 28, 2019, 12 pages.

International Search Report and Written Opinion, dated Nov. 7, 2019, issued in corresponding International Application No. PCT/CN2019/077012, filed Mar. 5, 2019, 13 pages.

Indian Examination Report dated Mar. 24, 2022, in corresponding Indian Application No. 202127038916, filed Aug. 27, 2021, 5 pages.

* cited by examiner

BUCK-BOOST CIRCUIT AND CONTROL METHOD

CROSS-REFERENCE TO RELATED APPLICATIONS

This application is a national stage of International Application No. PCT/CN2019/077012, filed on Mar. 5, 2019, which claims priority to Chinese Patent Application No. 201910081664.8, filed on Jan. 28, 2019. All of the aforementioned applications are hereby incorporated by reference in their entireties.

TECHNICAL FIELD

The present disclosure relates to the field of direct current conversion, and in particular, to a buck-boost circuit and a method for controlling the buck-boost.

BACKGROUND

A buck-boost circuit can effectively reduce system power consumption by regulating an output voltage. With the starting of the age of 5G communication, a circuit capable of boosting and bucking a voltage quickly is needed to ensure a smooth communication and facilitate reduction of the system power consumption.

The existing buck-boost structure takes a too long time to realize buck-boost switching. As a result, a voltage stabilization time is relatively long when regulating the output voltage, especially when switching from a bucking mode to a boosting mode, an intermediate switching process is time-consuming, and thus the voltage stabilization time is too long to meet a communication requirement of a system, which reduces signal sensitivity when using the system, thereby causing a communication failure.

Therefore, how to reduce the voltage stabilization time when the buck-boost circuit regulates the voltage and regulate the voltage quickly has become a big problem to be solved.

SUMMARY

According to an aspect of the present disclosure, a buck-boost circuit is provided, and the buck-boost circuit includes a first switch, a second switch, a third switch, a fourth switch, a fifth switch, a first inductor, a first capacitor, and a second capacitor. A first terminal of the first switch is connected to an anode of an input power supply, a first terminal of the second switch is connected to an anode of an output power supply, a first terminal of the third switch and a first terminal of the first inductor are connected to a second terminal of the first switch, a second terminal of the third switch is connected to a cathode of the input power supply, a first terminal of the fourth switch is connected to a second terminal of the first inductor and a second terminal of the second switch, a second terminal of the fourth switch is connected to a cathode of the output power supply, and the second capacitor is connected in parallel between the anode and the cathode of the output power supply. The fifth switch is connected between the anode of the input power supply and the anode of the output power supply, a first terminal of the first capacitor is connected to the anode of the output power supply, and a second terminal of the first capacitor is connected to the anode and the cathode of the input power supply through switches, respectively.

In an embodiment, the second terminal of the first capacitor is connected to the anode and the cathode of the input power supply through the first switch and the third switch respectively.

In an embodiment, the buck-boost circuit further includes a sixth switch, and the sixth switch is connected between a second terminal of the fifth switch and the anode of the output power supply.

In an embodiment, the buck-boost circuit further includes a seventh switch and an eighth switch, and the second terminal of the first capacitor is connected to the anode and the cathode of the input power supply through the seventh switch and the eighth switch, respectively.

In an embodiment, the buck-boost circuit further includes a ninth switch, and the ninth switch is connected between the anode of the output power supply and a second terminal of the fifth switch.

According to another aspect of the present disclosure, a method for controlling a buck-boost circuit is provided. The buck-boost circuit includes a first switch, a second switch, a third switch, a fourth switch, a fifth switch, a first inductor, a first capacitor, and a second capacitor. The method includes:

obtaining an output voltage $V_{out}$ of the buck-boost circuit, and controlling at least one switch based on a relationship between the output voltage $V_{out}$ and a target voltage $V_{tar}$, and a relationship between the target voltage $V_{tar}$ and an input voltage $V_{BAT}$, where the controlling the switch includes:

turning on the fifth switch to charge the second capacitor connected to an output terminal of the buck-boost circuit in response to both $V_{out} < V_{tar} - \Delta V$ and $V_{tar} \leq V_{BAT}$ being satisfied; and turning off the fifth switch to enter a first operation mode in response to $V_{out} = V_{tar} - \Delta V$ being satisfied, wherein $\Delta V$ denotes a set voltage difference;

turning on the fifth switch and one switch of the switches that is connected between the second terminal of the first capacitor and the cathode of the input power supply to charge the second capacitor in response to both $V_{out} < V_{tar} - \Delta V$ and $V_{tar} > V_{BAT}$ being satisfied; turning off the fifth switch and the one switch connected between the second terminal of the first capacitor and the cathode of the input power supply and simultaneously turning on another switch of the switches that is connected between the second terminal of the first capacitor and the anode of the input power supply to charge the second capacitor through the first capacitor, in response to $V_{out} = V_{BAT}$ being satisfied; and turning off the another switch connected between the second terminal of the first capacitor and the anode of the input power supply to enter the first operation mode in response to $V_{out} = V_{tar} - \Delta V$ being satisfied;

turning on the second switch and the fourth switch in response to $V_{out} > V_{tar} + \Delta V$ being satisfied, and turning off the second switch and the fourth switch to enter the first operation mode in response to $V_{out} = V_{tar} + \Delta V$ being satisfied; and entering the first operation mode in response to $V_{tar} - \Delta V \leq V_{out} \leq V_{tar} + \Delta V$ being satisfied, where the first operation mode comprises: a mode where both the first switch and the fourth switch are in operation simultaneously, a mode where both the second switch and the third switch are in operation simultaneously, and a mode where the first switch and the second switch are turned on complementarily.

In an embodiment, the fifth switch and the third switch are turned on to charge the second capacitor in response to both $V_{out}<V_{tar}-\Delta V$ and $V_{tar}>V_{BAT}$ being satisfied; the fifth switch and the third switch are turned off and the first switch is turned on simultaneously to charge the second capacitor through the first capacitor in response to $V_{out}=V_{BAT}$ being satisfied; and the first switch is turned off to enter the first operation mode in response to $V_{out}=V_{tar}-\Delta V$ being satisfied.

In an embodiment, the buck-boost circuit further includes a sixth switch connected between a second terminal of the fifth switch and the anode of the output power supply, the sixth switch is turned on in response to $V_{out}<V_{tar}-\Delta V$ being satisfied, and the sixth switch is turned off in response to $V_{out}=V_{tar}-\Delta V$ being satisfied; the sixth switch is in a normally-turned-on state in response to $V_{tar}-\Delta V \leq V_{out} \leq V_{tar}$ being satisfied; and the sixth switch is in a normally-turned-off state in response to $V_{out}>V_{tar}$ being satisfied.

In an embodiment, the buck-boost circuit further includes a seventh switch and an eighth switch, the second terminal of the first capacitor is connected to the anode and the cathode of the input power supply through the seventh switch and the eighth switch, respectively, the fifth switch and the eighth switch are turned on to charge the second capacitor in response to both $V_{out}<V_{tar}-\Delta V$ and $V_{tar}>V_{BAT}$ being satisfied; the fifth switch and the eighth switch are turned off and the seventh switch is turned on simultaneously to charge the second capacitor through the first capacitor in response to $V_{out}=V_{BAT}$ being satisfied; and the seventh switch is turned off to enter the first operation mode in response to $V_{out}=V_{tar}-\Delta V$ being satisfied.

In an embodiment, the buck-boost circuit further includes a ninth switch connected between the anode of the output power supply and a second terminal of the fifth switch, the ninth switch is turned on in response to $V_{out}<V_{tar}-\Delta V$ being satisfied, and the ninth switch is turned off in response to $V_{out}=V_{tar}-\Delta V$ being satisfied; the ninth switch is in a normally-turned-on state in response to $V_{tar}-\Delta V \leq V_{out} \leq V_{tar}$ being satisfied; and the ninth switch is in a normally-turned-off state in response to $V_{out}>V_{tar}$ being satisfied.

According to the following detailed description of exemplary embodiments with reference to the accompanying drawings, other features and aspects of the present disclosure will become clear.

BRIEF DESCRIPTION OF DRAWINGS

The accompanying drawings included in this specification and constituting a part of this specification, together with this specification, illustrate exemplary embodiments, features, and aspects of the present disclosure, and are used to explain the principle of the present disclosure.

DESCRIPTION OF EMBODIMENTS

Figure 1:
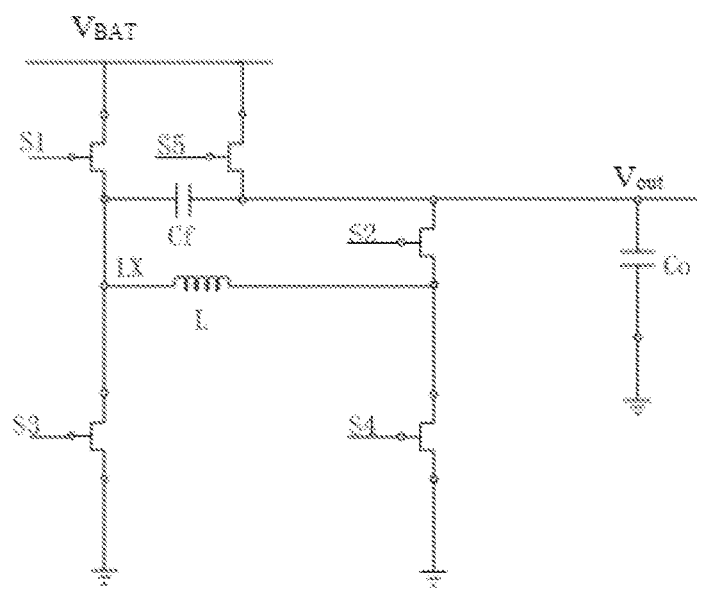
FIG. 1 is a structural diagram of a buck-boost circuit according to an embodiment of the present disclosure.

Various exemplary embodiments, features, and aspects of the present disclosure will be described in detail below with reference to the accompanying drawings. The same reference numerals in the accompanying drawings indicate elements with the same or similar functions. Although various aspects of the embodiments are shown in the accompanying drawings, unless otherwise noted, the accompanying drawings are not necessarily drawn to scale.

The dedicated word "exemplary" herein means "serving as an example, embodiment, or illustration". Any embodiment described herein as "exemplary" need not be construed as being superior to or better than other embodiments.

In addition, to better illustrate the present disclosure, numerous specific details are given in the following specific implementations. Those skilled in the art should understand that the present disclosure can also be implemented without certain specific details. In some examples, the methods, means, elements, and circuits well-known to those skilled in the art are not described in detail in order to highlight the subject matter of the present disclosure.

FIG. 1 is a structural diagram of a buck-boost circuit according to an embodiment of the present disclosure. As shown in FIG. 1, the buck-boost circuit includes a first switch S1, a second switch S2, a third switch S3, a fourth switch S4, a fifth switch S5, a first inductor L, a first capacitor Cf, and a second capacitor $C_O$.

The first switch S1, the second switch S2, the third switch S3, the fourth switch S4, and the first inductor L form a four-switch buck-boost circuit. A first terminal of the first switch S1 is connected to an anode of an input power supply $V_{BAT}$, and a first terminal of the second switch S2 is connected to an anode of an output power supply $V_{out}$. A voltage value of the input power supply can be a voltage value of an external power supply, and a voltage value of the output power supply $V_{out}$ is an actual output voltage value of the buck-boost circuit. A first terminal of the third switch S3 and a first terminal of the first inductor L are connected to a second terminal of the first switch S1, a second terminal of the third switch S3 is connected to a cathode of the input power supply $V_{BAT}$ (for example, connecting the ground), a first terminal of the fourth switch S4 is connected to a second terminal of the first inductor L and a second terminal of the second switch S2, a second terminal of the fourth switch S4 is connected to a cathode of the output power supply $V_{out}$ (for example, connecting the ground), and the second capacitor $C_O$ is connected in parallel between the anode and the cathode of the output power supply $V_{out}$.

The fifth switch is connected between the anode of the input power supply $V_{BAT}$ and the anode of the output power supply $V_{out}$, a first terminal of the first capacitor Cf is connected to the anode of the output power supply $V_{out}$, and a second terminal of the first capacitor Cf is connected to the anode and the cathode of the input power supply $V_{BAT}$ by using the first switch S1 and the third switch S3 respectively.

When a difference between the actual output voltage and a target voltage is large, in a process of gradually boosting or bucking the output voltage to reach the target voltage, the actual output voltage $V_{out}$ of the buck-boost circuit can be obtained, and operation statuses of the switches can be controlled based on a relationship between the output voltage $V_{out}$ and the target voltage $V_{tar}$ and a relationship between the target voltage $V_{tar}$ and an input voltage $V_{BAT}$, which realizes boosting and bucking processes quickly and stably. An initial status of each switch is in an off state by default, and the switch not mentioned in a control method is in the off state by default.

Figure 2:
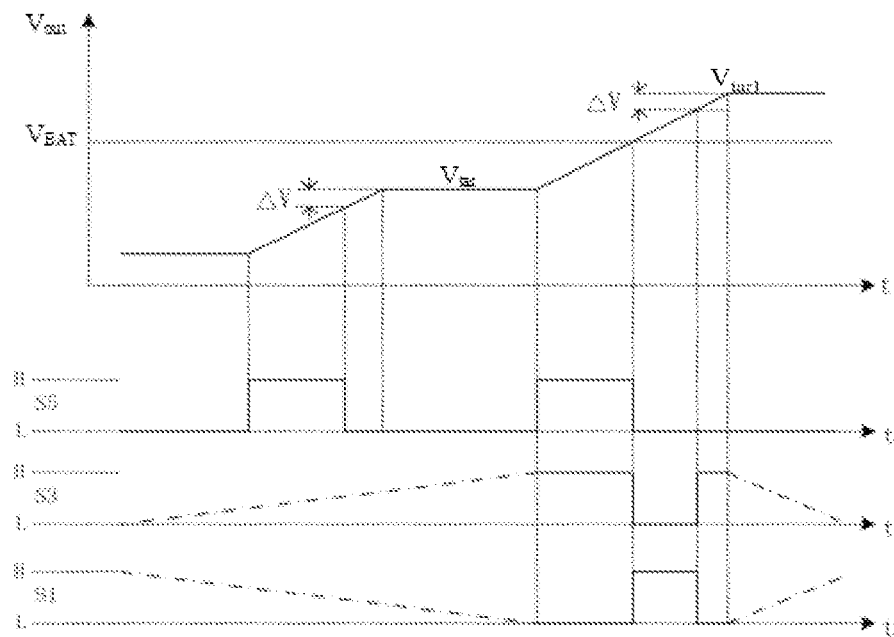
FIG. 2 shows an output voltage and a switch status in a boosting process of the buck-boost circuit in FIG. 1.

FIG. 2 shows an output voltage and a switch status in the bucking process of the buck-boost circuit in this embodiment. When $V_{out}<V_{tar}-\Delta V$ and $V_{tar}\leq V_{BAT}$, as represented by the first half of an output voltage curve in FIG. 2, the actual output voltage of the circuit is smaller than the target voltage, and the actual output voltage needs to be boosted to reach the target voltage, in other words, the output voltage is in a boosting state. $\Delta V$ denotes a set voltage difference. It is defined as required, for example, can be 100 mV, 200 mV, or the like.

At an initial stage, the supply voltage $V_{BAT}$ is greater than the output voltage. In this case, the fifth switch S5 is first turned on to quickly charge the second capacitor $C_O$ connected to an output terminal of the buck-boost circuit. The output voltage is boosted quickly. When the output voltage is smaller than the target voltage by $\Delta V$, namely, $V_{out}=V_{tar}-\Delta V$, the fifth switch S5 is turned off to stop such quick charging. The circuit is restored to the four-switch buck-boost circuit, and enters a first operation mode, namely, a normal operation mode of the four-switch buck-boost circuit. The output voltage is gradually regulated to the target voltage $V_{tar}$, and the target voltage $V_{tar}$ is stably output.

The first operation mode includes: a mode where the first switch S1 and the fourth switch S4 are in operation simultaneously, a mode where the second switch S2 and the third switch S3 are in operation simultaneously, and the first switch S1 and the second switch S2 are turned on complementarily, in other words, the third switch S3 and the fourth switch S4 are also turned on complementarily.

When $V_{tar}>V_{BAT}$, as represented by the last half of the output voltage curve in FIG. 2, the circuit is essentially a boosting circuit, and the actual output voltage needs to be boosted to reach the target voltage, in other words, the output voltage is in the boosting state. In this case, the fifth switch S5 and the third switch S3 are first turned on, and then turned off when the output voltage reaches $V_{BAT}$, and the first switch S1 is turned on to continue to quickly charge the second capacitor $C_O$ through the first capacitor Cf. When the output voltage is smaller than the target voltage by $\Delta V$, the first switch S1 is turned off, and the first operation mode is activated.

Figure 3:
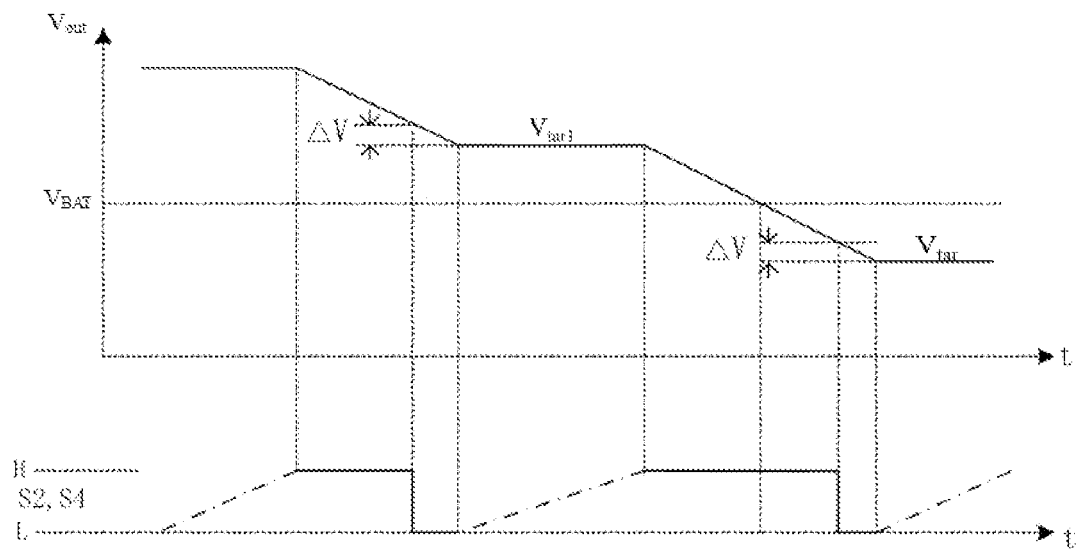
FIG. 3 shows an output voltage and a switch status in a bucking process of the buck-boost circuit in FIG. 1.

FIG. 3 shows an output voltage and a switch status in the bucking process of the buck-boost circuit in this embodiment. When $V_{out}>V_{tar}+\Delta V$, as represented by an output voltage curve in FIG. 3, the actual output voltage is greater than the target voltage, and the actual output voltage needs to be bucked to reach the target voltage, in other words, the output voltage is in a bucking state.

The second switch S2 and the fourth switch S4 are first turned on to discharge the second capacitor $C_O$. When the voltage is greater than the target voltage by $\Delta V$, namely, $V_{out}=V_{tar}+\Delta V$, the second switch S2 and the fourth switch S4 are turned off, and the first operation mode is activated.

The fifth switch S5 connected between the input power supply and the output power supply, and the first capacitor Cf connected to the output power supply are used for quick charging at the initial stage of the boosting process, and the second switch S2 and the fourth switch S4 that are connected between the anode and the cathode of the output power supply are used to discharge, at the initial stage of the bucking process, the second capacitor $C_O$ connected between the anode and the cathode of the output power supply. When the difference between the actual output voltage and the target voltage is equal to the set voltage difference $\Delta V$, the normal operation mode of the four-switch buck-boost circuit is activated, which can reduce a voltage stabilization time of the buck-boost circuit when the output voltage is regulated, and can regulate the voltage quickly and stably.

The second capacitor $C_O$ connected in parallel between the anode and the cathode of the output power supply $V_{out}$ is configured to filter the output voltage.

Each switch provided in some embodiment of the present disclosure can be a semiconductor transistor, such as a bipolar transistor, a field effect transistor, or a switch of any other type.

A method for controlling the buck-boost circuit can be executed by using a control module. The control module can be implemented in the buck-boost circuit, or can be independent from the buck-boost circuit, and can execute, according to a preset program or an external instruction, control methods in embodiments of the present disclosure to control the switch.

Figure 4:
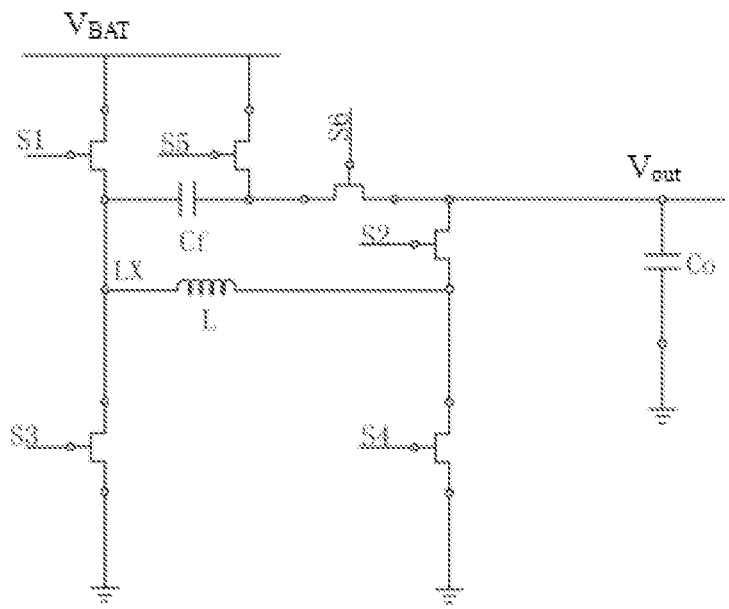
FIG. 4 is a structural diagram of a buck-boost circuit according to an implementation of the present disclosure.

FIG. 4 is a structural diagram of a buck-boost circuit according to an embodiment of the present disclosure. As shown in FIG. 4, compared with the buck-boost circuit in FIG. 1, the buck-boost circuit further includes a sixth switch S6 connected between a second terminal of the fifth switch S5 and the anode of the output power supply.

When the sixth switch S6 is in a normally-open state (namely, the sixth switch S6 is in an ON state continuously), an operation status of the buck-boost circuit is the same as that shown in FIG. 1.

In this embodiment, a method for controlling the circuit includes:
when $V_{out}<V_{tar}-\Delta V$, in other words, when the output voltage is in the boosting state, turning on the sixth switch S6, and when the output voltage is smaller than the target voltage by $\Delta V$, turning off the sixth switch S6;
when $V_{tar}-\Delta V\leq V_{out}\leq V_{tar}$, in other words, when the difference between the output voltage and the target voltage is small, or when the target voltage is output stably, enabling the sixth switch S6 to be in a normally-closed state (namely, the sixth switch is in an OFF state continuously), so that a voltage change on the two terminals of Cf does not affect the output voltage; and
when $V_{out}>V_{tar}$, in other words, when the output voltage is in the bucking state, the sixth switch S6 is in the normally-open state.

Figure 5:
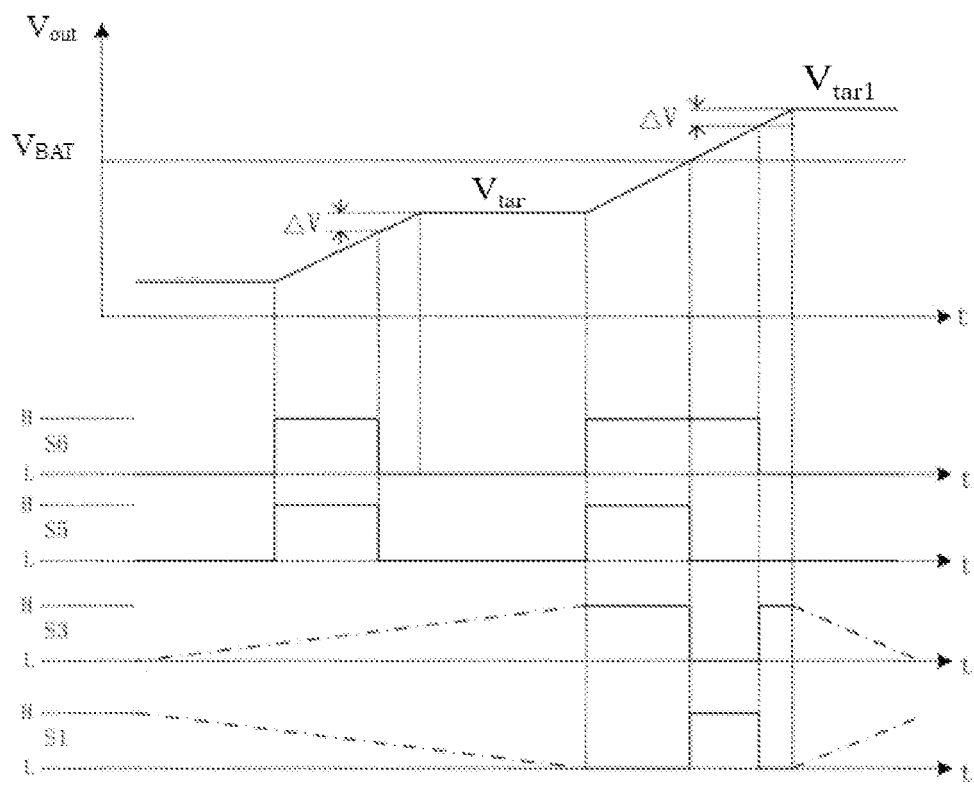
FIG. 5 shows an output voltage and a switch status in a boosting process of the buck-boost circuit in FIG. 4.

In this embodiment, the sixth switch S6 is in the normally-open state in the bucking process, and a control method is the same as that in the bucking process of the buck-boost circuit in FIG. 1. Therefore, an output voltage diagram and a switch status diagram in the bucking process are omitted. FIG. 5 shows an output voltage and a switch status in the boosting process of the buck-boost circuit. As shown in the figure, methods for controlling the first switch S1, the third switch S3, and the fifth switch S5 are the same as those of the buck-boost circuit in FIG. 1.

Figure 6:
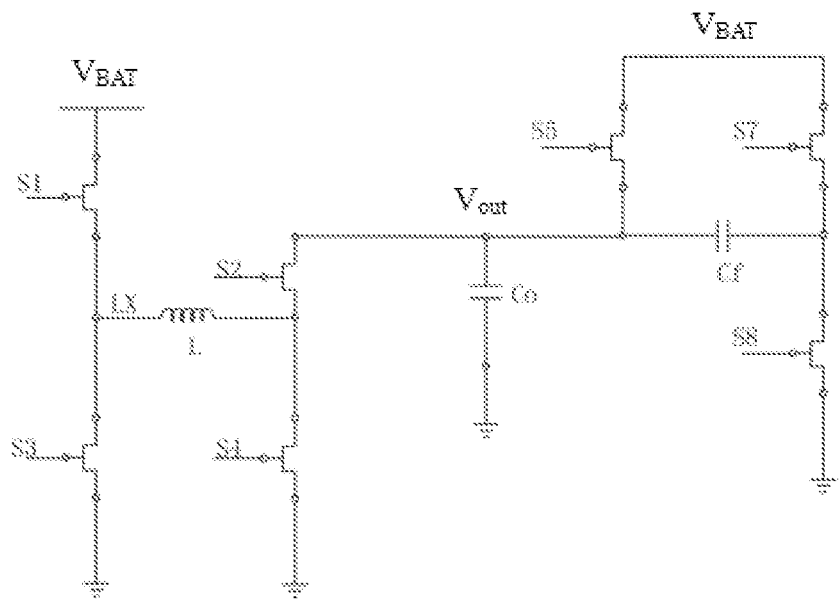
FIG. 6 is a structural diagram of a buck-boost circuit according to an embodiment of the present disclosure.

FIG. 6 is a structural diagram of a buck-boost circuit according to an embodiment of the present disclosure. As shown in FIG. 6, compared with the buck-boost circuit in FIG. 1, the buck-boost circuit further includes a seventh switch S7 and an eighth switch S8, and the second terminal of the first capacitor Cf is connected to the anode and the cathode of the input power supply through the seventh switch S7 and the eighth switch S8, respectively.

Figure 7:
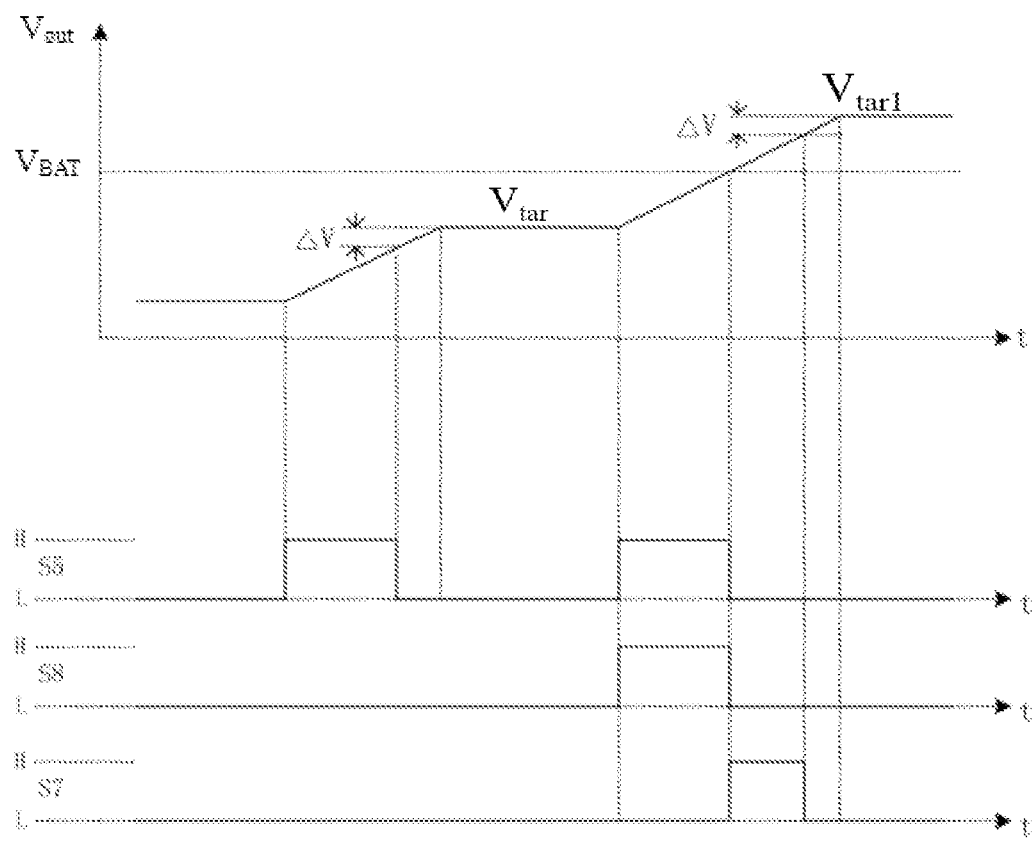
FIG. 7 shows an output voltage and a switch status in a boosting process of the buck-boost circuit in FIG. 6.

In this embodiment, the seventh switch S7 and the eighth switch S8 are in the normally-closed state in the bucking process. Therefore, the control method is the same as that in the bucking process of the buck-boost circuit in FIG. 1. However, the boosting process of the buck-boost circuit in this embodiment is realized by controlling the fifth switch S5, the seventh switch S7, and the eighth switch S8, which is different from the boosting process of the buck-boost circuit in FIG. 1. FIG. 7 shows an output voltage and a switch status in the boosting process of the buck-boost circuit.

In the boosting process, when $V_{tar} \le V_{BAT}$, the fifth switch S5 is first turned on to quickly charge the second capacitor $C_O$ connected to the output terminal. The output voltage is boosted quickly. When the output voltage is smaller than the target voltage by $\Delta V$, namely, $V_{out} = V_{tar} - \Delta V$, the fifth switch S5 is turned off to stop quick charging, and the first operation mode is activated. This process is the same as that in FIG. 1.

When $V_{tar} > V_{BAT}$, the fifth switch S5 and the eighth switch S8 are first turned on, and then turned off when the output voltage reaches $V_{BAT}$, and the seventh switch S7 is turned on to continue to quickly charge, by using the first capacitor Cf, the second capacitor $C_O$ connected to the output terminal. When the output voltage is smaller than the target voltage by $\Delta V$, the seventh switch S7 is turned off, and the first operation mode is activated.

In this embodiment, quick charging is realized by using the fifth switch S5, the seventh switch S7, and the eighth switch S8, instead of by using the switches in the four-switch buck-boost circuit.

Figure 8:
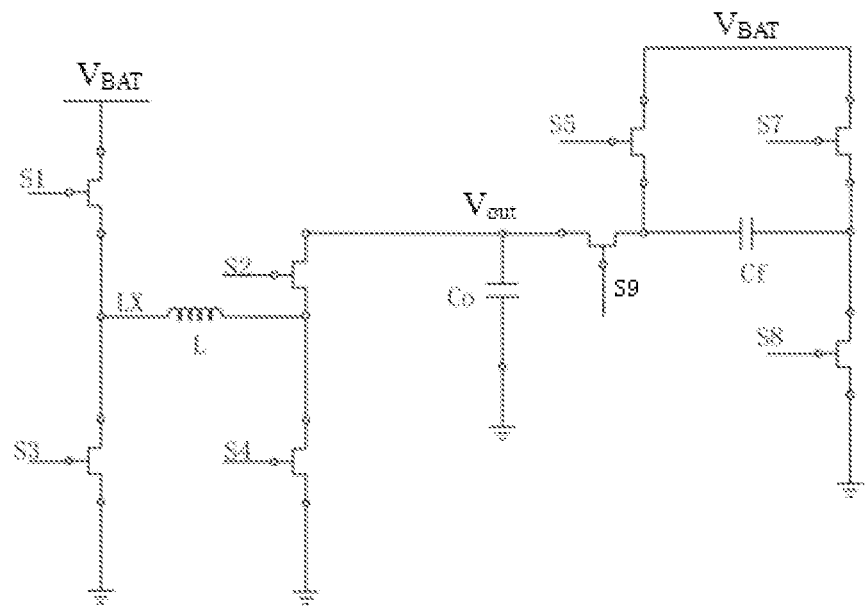
FIG. 8 is a structural diagram of a buck-boost circuit according to an embodiment of the present disclosure.

FIG. 8 is a structural diagram of a buck-boost circuit according to an embodiment of the present disclosure. As shown in FIG. 8, compared with the buck-boost circuit in FIG. 6, the buck-boost circuit further includes a ninth switch S9 connected between the anode of the output power supply and a second terminal of the fifth switch S5.

When the ninth switch S9 is in the normally-open state, an operating status of the buck-boost circuit is the same as that in the scheme shown in FIG. 6.

In this embodiment, a method for controlling the circuit includes:
- when $V_{out} < V_{tar} - \Delta V$, in other words, when the output voltage is in the boosting state, turning on the ninth switch S9, and when the output voltage is smaller than the target voltage by $\Delta V$, turning off the ninth switch S9;
- when $V_{tar} - \Delta V \le V_{out} \le V_{tar}$, in other words, when the difference between the output voltage and the target voltage is small, or when the target voltage is output stably, enabling the ninth switch S9 to be in the normally-closed state, so that the voltage change on the two terminals of Cf does not affect the output voltage; and
- when $V_{out} > V_{tar}$, in other words, when the output voltage is in the bucking state, enabling the ninth switch S9 to be in the normally-open state.

Figure 9:
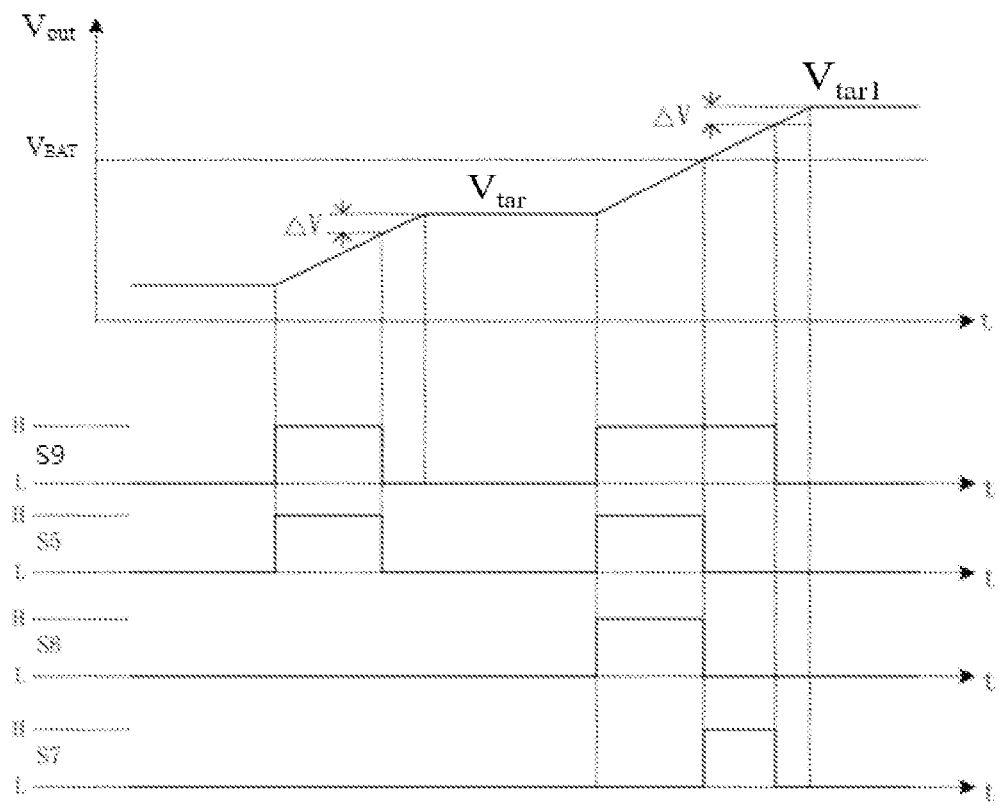
FIG. 9 shows an output voltage and a switch status in a boosting process of the buck-boost circuit in FIG. 8.

In this embodiment, the ninth switch S9 is in the normally-open state in the bucking process, and a control method is the same as that in the bucking process in FIG. 6. Therefore, an output voltage diagram and a switch status diagram in the bucking process are omitted. FIG. 9 shows an output voltage and a switch status in the boosting process of the buck-boost circuit. As shown in the figure, in the boosting process, control methods of the fifth switch S5 and the seventh switch S7 are the same as those of the buck-boost circuit in FIG. 6.

The embodiments of the present disclosure have been described above, and the above description is exemplary, not exhaustive, and is not limited to the disclosed embodiments. It is apparent to those skilled in the art that many modifications and changes may be made without departing from the scope and spirit of the described embodiments. The terms used in this specification are selected to best explain principles of the embodiments, practical applications, or improvements to technologies in the market, or to enable other persons of ordinary skill in the art to understand the embodiments disclosed in this specification.

What is claimed is:

1. A buck-boost circuit, comprising a first switch, a second switch, a third switch, a fourth switch, a fifth switch, a sixth switch, a first inductor, a first capacitor, and a second capacitor,
    wherein a first terminal of the first switch is connected to an anode of an input power supply, a first terminal of the second switch is connected to an anode of an output power supply, a first terminal of the third switch and a first terminal of the first inductor are connected to a second terminal of the first switch, a second terminal of the third switch is connected to a cathode of the input power supply, a first terminal of the fourth switch is directly connected to a second terminal of the first inductor and a second terminal of the second switch, a second terminal of the fourth switch is connected to a cathode of the output power supply, and the second capacitor is connected in parallel between the anode and the cathode of the output power supply;
    the fifth switch is connected between the anode of the input power supply and the anode of the output power supply, a first terminal of the first capacitor is connected to the anode of the output power supply, and a second terminal of the first capacitor is connected to the anode and the cathode of the input power supply through switches, respectively;
    the fifth switch is directly connected to the anode of the input power supply; and
    the sixth switch is directly connected between a second terminal of the fifth switch and the anode of the output power supply.

2. The buck-boost circuit according to claim 1, further comprising:
    a sixth switch, wherein the sixth switch is connected between a second terminal of the fifth switch and the anode of the output power supply.

3. The buck-boost circuit according to claim 1, further comprising:
    a seventh switch; and
    an eighth switch, wherein the second terminal of the first capacitor is connected to the anode and the cathode of the input power supply through the seventh switch and the eighth switch, respectively.

4. A method for controlling a buck-boost circuit,
    wherein the buck-boost circuit comprises a first switch, a second switch, a third switch, a fourth switch, a fifth switch, a first inductor, a first capacitor, and a second capacitor; and
    wherein the method comprises:
    obtaining an output voltage $V_{out}$ of the buck-boost circuit, and controlling at least one switch based on a relationship between the output voltage $V_{out}$ and target voltages $V_{tar}$ and $V_{tar1}$ and a relationship between the target voltages $V_{tar}$ and $V_{tar1}$ and an input voltage $V_{BAT}$,
    wherein said controlling the at least one switch comprises:
    turning on the fifth switch to charge the second capacitor connected to an output terminal of the buck-boost circuit in response to both $V_{out} < V_{tar} - \Delta V$ and $V_{tar} \le V_{BAT}$ being satisfied; and turning off the fifth switch to enter a first operation mode in response to $V_{out}=V_{tar}-\Delta V$ being satisfied, wherein $\Delta V$ denotes a set voltage difference;

turning on the fifth switch and one switch of the switches that is connected between a second terminal of the first capacitor and a cathode of the input power supply to charge the second capacitor in response to both $V_{out}<V_{tar1}-\Delta V$ and $V_{tar1}>V_{BAT}$ being satisfied;

turning off the fifth switch and the one switch connected between the second terminal of the first capacitor and the cathode of the input power supply and simultaneously turning on another switch of the switches that is connected between the second terminal of the first capacitor and an anode of the input power supply to charge the second capacitor through the first capacitor, in response to $V_{out}=V_{BAT}$ being satisfied; and turning off the another switch connected between the second terminal of the first capacitor and the anode of the input power supply to enter the first operation mode in response to $V_{out}=V_{tar1}-\Delta V$ being satisfied;

turning on the second switch and the fourth switch in response to $V_{out}>V_{tar1}+\Delta V$ being satisfied, and turning off the second switch and the fourth switch to enter the first operation mode in response to $V_{out}=V_{tar1}+\Delta V$ being satisfied; and entering the first operation mode in response to $V_{tar}-\Delta V \leq V_{out} \leq V_{tar1}+\Delta V$ being satisfied; and wherein the first operation mode comprises: a mode where both the first switch and the fourth switch are in operation simultaneously, a mode where both the second switch and the third switch are in operation simultaneously, and a mode where the first switch and the second switch are turned on complementarily.

5. The method for controlling the buck-boost circuit according to claim 4, wherein the fifth switch and the third switch are turned on to charge the second capacitor in response to both $V_{out}<V_{tar1}-\Delta V$ and $V_{tar1}>V_{BAT}$ being satisfied; the fifth switch and the third switch are turned off and the first switch is turned on simultaneously to charge the second capacitor through the first capacitor in response to $V_{out}=V_{BAT}$ being satisfied; and the first switch is turned off to enter the first operation mode in response to $V_{out}=V_{tar1}-\Delta V$ being satisfied.

6. The method for controlling the buck-boost circuit according to claim 5, wherein the buck-boost circuit further comprises a sixth switch connected between a second terminal of the fifth switch and the anode of the output power supply; and wherein the sixth switch is turned on in response to $V_{out}<V_{tar}-\Delta V$ being satisfied, and the sixth switch is turned off in response to $V_{out}=V_{tar}-\Delta V$ being satisfied;

the sixth switch is in a normally-turned-on state in response to $V_{tar}-\Delta V \leq V_{out} \leq V_{tar}$ being satisfied; and the sixth switch is in a normally-turned-off state in response to $V_{out}>V_{tar}$ being satisfied.

7. The method for controlling the buck-boost circuit according to claim 4, wherein the buck-boost circuit further comprises a seventh switch and an eighth switch, wherein the second terminal of the first capacitor is connected to the anode and the cathode of the input power supply through the seventh switch and the eighth switch, respectively; and wherein the fifth switch and the eighth switch are turned on to charge the second capacitor in response to both $V_{out}<V_{tar}-\Delta V$ and $V_{tar1}>V_{BAT}$ being satisfied; the fifth switch and the eighth switch are turned off and the seventh switch is turned on simultaneously to charge the second capacitor through the first capacitor in response to $V_{out}=V_{BAT}$ being satisfied; and the seventh switch is turned off to enter the first operation mode in response to $V_{out}=V_{tar1}-\Delta V$ being satisfied.

8. The method for controlling the buck-boost circuit according to claim 7, wherein the buck-boost circuit further comprises a ninth switch connected between the anode of the output power supply and a second terminal of the fifth switch; and wherein the ninth switch is turned on in response to $V_{out}<V_{tar}-\Delta V$ being satisfied, and the ninth switch is turned off in response to $V_{out}=V_{tar}-\Delta V$ being satisfied;

the ninth switch is in a normally-turned-on state in response to $V_{tar}-\Delta V \leq V_{out} \leq V_{tar}$ being satisfied; and the ninth switch is in a normally-turned-off state in response to $V_{out}>V_{tar}$ being satisfied.

\* \* \* \* \*